March 26, 1929. L. J. OLLESHEIMER 1,707,135
COMPRESSED LAMINATED FIBROUS PRODUCT AND PROCESS OF MAKING THE SAME
Filed Oct. 28, 1927 2 Sheets-Sheet 2
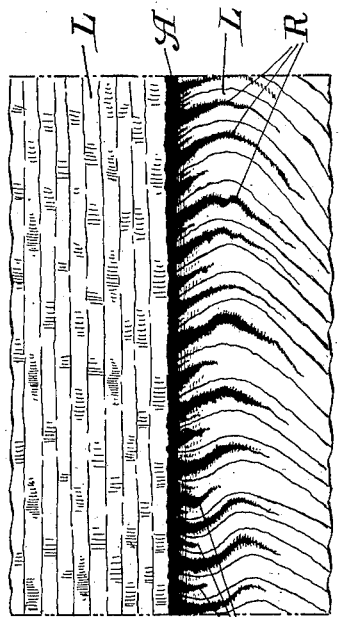
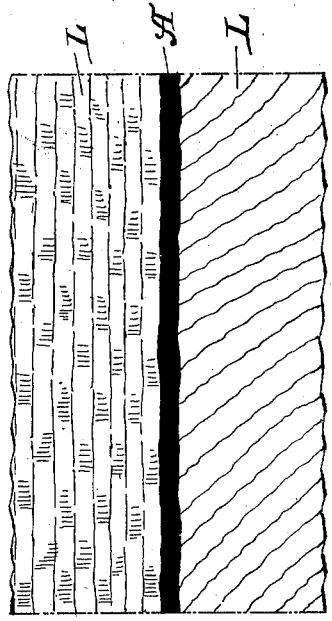
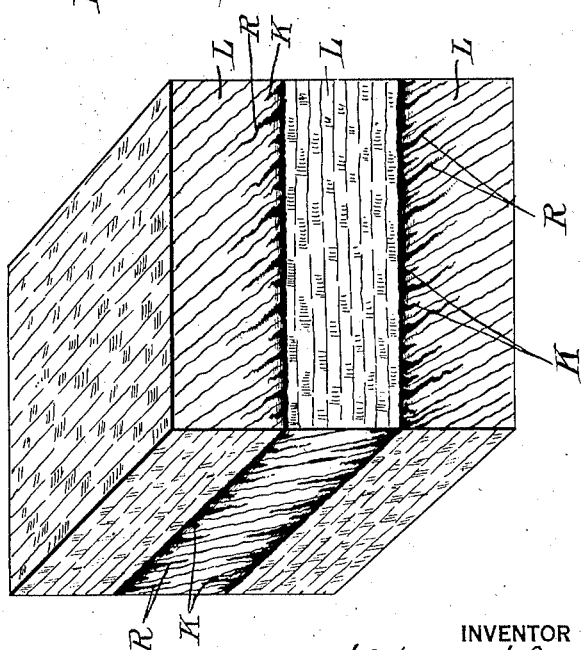
WITNESS
INVENTOR
LAWRENCE J. OLLESHEIMER
BY
ATTORNEYS Patented Mar. 26, 1929.

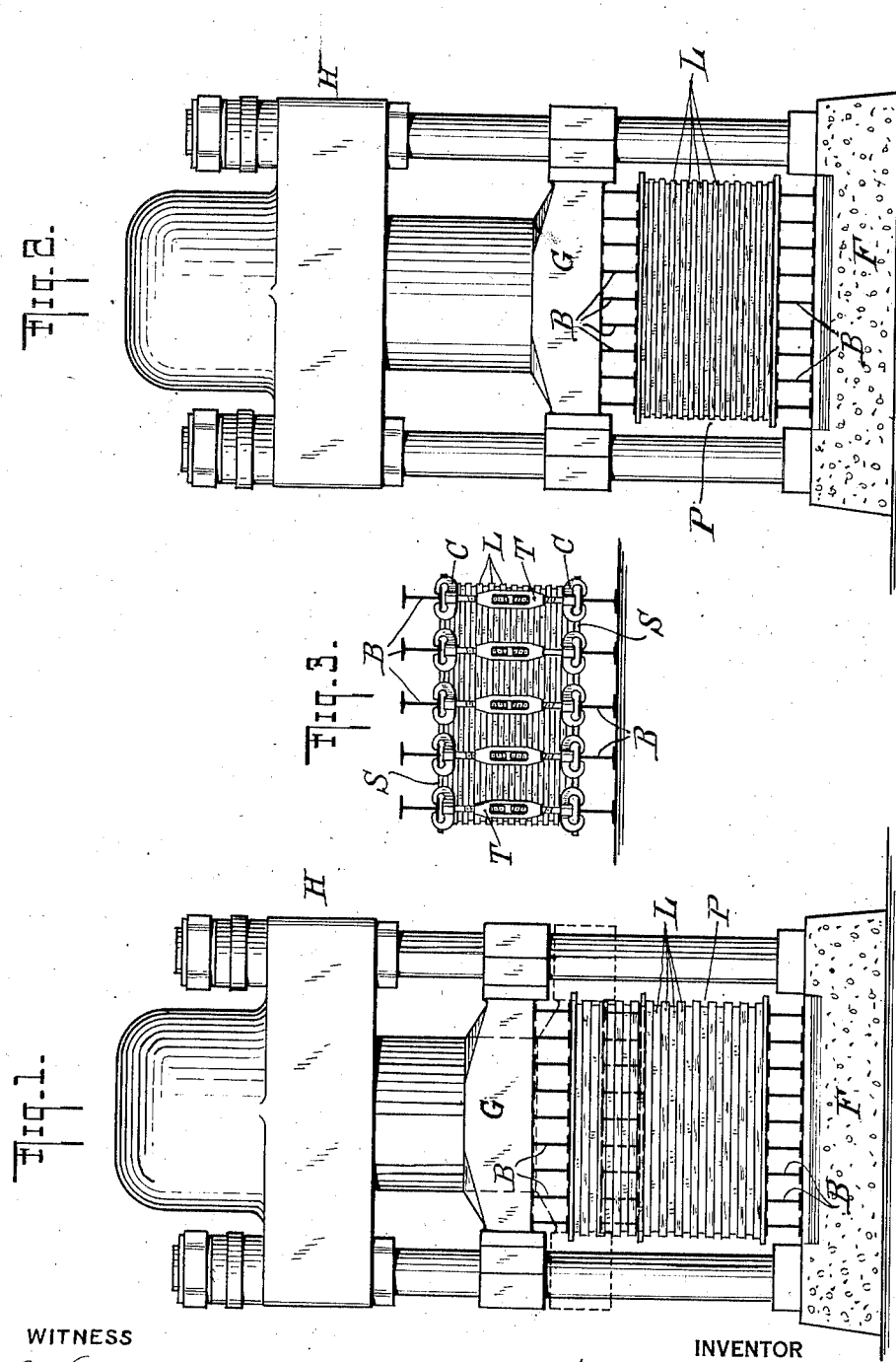

1,707,135

UNITED STATES PATENT OFFICE.

LAWRENCE J. OLLESHEIMER, OF WEST ORANGE, NEW JERSEY, ASSIGNOR TO SPRUCO-LITE CORPORATION, INC., OF WEST ORANGE, NEW JERSEY, A CORPORATION OF NEW JERSEY.

COMPRESSED LAMINATED FIBROUS PRODUCT AND PROCESS OF MAKING THE SAME.

Application filed October 28, 1927. Serial No. 229,515.

This invention relates to compressed composite products of laminated material having a fibrous structure and to an improved process for the production of such products.

The object of the invention is to attain a predeterminable uniformity of product by a safe and practical procedure.

In my companion application, Serial No. 229,521, filed October 28, 1927, I have set forth an invention dealing with the manufacture of products such as are the subject of this application, the essence of said invention residing in the process of drying to a subnormal degree the wood or fibrous material which is used in the manufacture of the product. In carrying out the said invention, valuable and highly desirable results can be obtained if the procedure set forth in this specification is followed.

The present invention deals more particularly with that step in the process of making composite laminated products united under exceedingly great pressure, which is concerned with the steps to be followed after the application of the excessive compression and before the compressed material is released from confining influences and thereby becomes the product which is to be fabricated into articles of commerce. Heretofore, as set forth, for example, in U. S. Patent No. 1,465,383, of August 21, 1923, it has been proposed to compress a stack or pile of wooden boards surfaced with a binder to enormous pressures and to maintain said pressures at least until the binder had assumed a permanent set. In some cases the enormous pressure was maintained for a long period of time in order to reduce to as large an extent as possible the so-called "spring back" of the compressed material which occurs when the pressure is released before the composite block has assumed permanent dimensions. It was also proposed to make an allowance for the so-called "spring back" by first compressing the combined material beyond the degree required for the dimensions of the ultimate product and then, after maintaining such pressure until the binder had set, releasing the pressure whereupon the composite block would expand and assume dimensions approximating those desired for the final product.

The object of the present invention is to obtain important results by the adoption of a novel method of procedure. The invention is illustrated in the accompanying drawings in which Fig. 1 illustrates somewhat diagrammatically an elevational view of a hydraulic press containing a charge or pile of material having a fibrous structure. Fig. 2 is a view similar to Fig. 1, showing the press in its final stage. Fig. 3 is an elevational view of a clamped block of compressed material in the condition in which said block is taken from the press. Fig. 4 is a fragmentary perspective view of a block of product with the position of the binder material indicated in an exaggerated fashion. Fig. 5 depicts a joint between adjacent layers of the compressed composite fabric, magnified by sixty diameters. Fig. 6 is a view similar to Fig. 5 of the same joint when produced in accordance with prior practice.

The invention comprises, speaking broadly, the application of an initial over-compression followed, before the binder has set, by a release of the pressure to the precise degree required for the dimensions of the ultimate product, whereby the over-compressed mass of material is permitted to expand partially, but not to the full extent of its expansive capacity and a maintenance thereafter of the reduced pressure until the block as a whole has acquired a permanent set.

Referring to the drawings, the letter P designates a pile of wooden boards or the like mounted in a hydraulic press H between steel plates S. Under the lowest steel plate and on top of the upper steel plate a plurality of metal beams, preferably steel I-beams B are positioned.

The layers of boards L constituting pile P are preferably arranged at an angle with respect to each other, so that the grain of the wood in each layer is at an angle to the grain of the wood in the adjacent layers. Each layer may be formed of a single board or of a plurality of boards or strips. Where a plurality of boards is employed they are preferably spaced close together laterally, in order that a compact block may be made. These boards, before they are stacked into the pile P, are surfaced or coated with an appropriate binder such for example as is described in my said companion application, Serial No. 229,521, filed October 28, 1927. Briefly speaking, said binder is preferably a freshly prepared casein glue. Fig. 1 shows the pile of wooden boards adhesively associated by the binder at its normal height and in position for the application of the very great pressure exercisable by the hydraulic press H. The pressure of the hydraulic press is preferably at first applied at a slow and gradual rate to permit the binder or cement to thoroughly fill all the open spaces between contiguous boards. In some instances the weight of the plunger G of the press H is sufficient to effect the preliminary pressure and setting operation. When the said condition has been reached, the pressure is preferably maintained for a short period of time, say ten minutes, until the binder material at the outside edges of the joints has assumed a temporary set. This condition of the binder at said points operates, in the subsequent operations, to prevent extrusion of binder material laterally of the joints between adjacent boards. When this stage has been reached, the block as a whole is subjected to intense compression, the pressure being gradually increased in the hydraulic press until the pile is over-compressed to an extent such as is indicated by the dotted lines in Fig. 1. By over-compressing I mean pressing the pile beyond the ultimate or final height desired in the product.

The compressed mass or pile of boards, after being thus over-compressed, is then permitted to expand partially within a limited range, but not to the full extent of its expansive capacity. This is accomplished by releasing the hydraulic pressure to the desired extent. In practice I have generally found that a relative limited expansion is sufficient to effect and to satisfy the operations and to produce the results contemplated by my invention. For example, in compressing a pile of wood having an original height of about 37 inches, and which in the ultimate product is to have a predetermined height of 26 inches, it was found sufficient to compress the pile under the application of a pressure of about 3,000 pounds per square inch to 24 inches, and then allowing a re-expansion to the predetermined 26 inches. By thus first over-compressing and then partially but not wholly releasing the pressure, the "spring back" tendency of the over-compressed block is afforded an opportunity to dissipate its potential force, and when the finally set block is released from confining agents, there is substantially no tendency to spring back left in the product.

By making provision to cause the pile of wood to re-expand after over-compression, at a time when the binder has not yet permanently set, it appears that the binder is drawn or sucked into the pores, interstices, and spaces existing within and between the compressed fibrous wood structure. In this manner the binder penetrates a substantial portion of the fibrous structure and not only cements adjacent or contiguous boards, but serves to unite the fibres to each other, participating also, it seems, in counteracting the remaining feeble "spring back" tendency which might otherwise still be effective in the compressed block. In other words, the method of the new procedure involves the establishment of a new type of interlocking joint as between adjacent boards. The new procedure of first over-compressing and then partially re-expanding avoids the dangerous condition likely to be present in any factory where it is attempted to confine an over-compressed block by mechanical clamps which under the excessive stresses have a tendency to break and fly off with the force of a projectile. By the partial release of pressure in accordance with the new invention, the stresses effective upon the mechanical clamps required for subsequent handling of the confined blocks of product, are reduced to a range of reliability and safety.

After the press has thus first over-compressed the block of composite material to the dotted line position shown in Fig. 1, and the pressure has been partially released to a predetermined extent, said position being shown in Fig. 2, clamps C are clamped to the upper and lower I beams respectively and the turn buckles T are manipulated until the clamps are tight. The whole compressed block or pile is thus, at this moment, held in confinement by the clamped I-beams within predetermined dimensions. After thus locking the pile or stack, the hydraulic plunger G is raised and the entire confined, clamped, block is removed from the press and allowed to remain in its locked condition until it has assumed a substantially permanent set and a stable state. In the meantime the press is used in connection with a preparation of further blocks of a composite material, all made in accordance with the principles heretofore described. The press may thus function in speedy succession, instead of being required as in the case of some of the operations of the prior art, to remain for a long time under compression against the block of material.

The length of time during which the clamped confined block of composite material, when made in accordance with the new process, is allowed to mature or to set, obviously varies according to the nature and dimensions of the material constituting the composite block. When using spruce boards of about a quarter of an inch in thickness, and a casein glue as a binder, a period of approximately four days will be ample to render the block sufficiently permanent and stable to permit the clamps to be removed, and the block to be taken from between the steel plates and I-beams for fabrication of products from said block. The clamps are, of course, removed by opening the turn buckles or whatever equivalent device may have been used. Once the block of composite material is finished, it may be treated or cut in any desired manner appropriate to the production of some desired article. The product obtained by the use of the improved procedure possesses a superior uniformity of structure and a very great internal cohesive strength. These results I attribute in a large measure to the penetration of the binder into the pores between the fibrous material, such penetration being a function of the novel method of procedure. In order to indicate the nature of the physical action which occurs in the new procedure contrasted with the old procedure, I have shown the contrast between a new joint and an old joint, on a greatly enlarged scale, in Figs. 5 and 6. In Fig. 6 the binder A has received its permanent set while the wood was under compression without having been given the opportunity of springing back to a limited extent before the binder sets. As seen from this Fig. 6 there is substantially no penetration of the binder A into the pores of the wood. In Fig. 5 on the other hand the binder A provides not only for firm surface adhesion as between adjacent wooden strips, but actually penetrates into the wood itself, assuming therein the form of what might be termed peaks or anchors K and runners R. It will be apparent from Fig. 6 that any distribution of binder substance as shown in that figure will not only greatly strengthen the adhesive union between adjacent pieces of wood, but will reduce the thickness of the glue joint to a minimum. When the wood is preliminarily dried to a subnormal degree in the manner set forth in my companion application heretofore referred to, the penetration effect of the binder shown in Fig. 5 is accentuated and a bond is created at the joint which has tremendous cohesive and interlocking effect, density, and strength.

Inasmuch as the layers of wood are preferably arranged so that the grain of the wood of adjacent superposed layers does not run in the same direction, Fig. 5 shows the penetration of the binder into the lower piece of wood only. The binder actually penetrates both the upper and the lower pieces of wood. This is clearly shown in Fig. 4 in which the anchor or peaks K and runners R are illustrated in exaggerated manner as extending into the lower as well as into the upper piece of wood.

I claim:

1. The process of producing compressed composite products which comprises preparing a multiplicity of units of material having a fibrous structure, surfacing said units with a binder, arranging said units in a stack, subjecting said stack to compression both enormous and greater than that required for the desired product, releasing said pressure before the binder has acquired a permanent set to permit a limited and a partial re-expansion of the compressed stack to the predetermined dimension of the desired product and to cause binder material to be drawn into the pores in the adjacent fibrous material and maintaining said stack in said partially expanded state until the binder and the stack have acquired a permanent set within the confines of the predetermined dimensions of the product, said process being conducted as described and set forth in the foregoing specification.

2. The process of producing compressed composite products which comprises preparing a multiplicity of units of wood, surfacing said units with a binder, arranging said units in a stack, subjecting said stack to compression both enormous and greater than that required for the desired product, releasing said pressure before the binder has acquired a permanent set to permit a limited and partial re-expansion of the compressed stack to the predetermined dimension of the desired product and to cause binder material to be drawn into the pores in the adjacent wood, locking said stack in its partially expanded state and maintaining said stack in its locked condition until the binder and the stack have acquired a permanent set within the confines of the predetermined dimensions of the product, said process being conducted as described and set forth in the foregoing specification.

3. A composite compressed product made in accordance with the process set forth in claim 1.

4. A composite product such as more fully described in the foregoing specification, said product being composed of laminæ of wood and of a permanently set adhesive substance intermediate of the wooden laminæ, the fibrous structure of the wood being of such close frictional contact as results from high pressure of the composite material in the course of its manufacture, and stringers of permanently set adhesive substance in the pores in the adjacent wood material, said stringers occupying such positions in said pores as result from an initial overcompression of the wood followed, before the adhesive has acquired a permanent set, by a limited release of said compression and then by a maintenance of the block under said limitedly released compression until the adhesive substance and the wood have acquired a permanent set within the confines of pre-determined dimensions of the product.

In testimony whereof I have hereunto set my hand.

LAWRENCE J. OLLESHEIMER.